US010637372B2

United States Patent
Larsén et al.

(10) Patent No.: US 10,637,372 B2
(45) Date of Patent: Apr. 28, 2020

(54) FAILSAFE HARDWARE BRAKE MECHANISM FOR OUTDOOR POWER EQUIPMENT

(71) Applicant: HUSQVARNA AB, Huskvarna (SE)

(72) Inventors: Martin Larsén, Jönköping (SE); Ted Wolfram, Vrigstad (SE); Mattias Connysson, Habo (SE)

(73) Assignee: HUSQVARNA AB, Huskvarna (SE)

( * ) Notice: Subject to any disclaimer, the term of this patent is extended or adjusted under 35 U.S.C. 154(b) by 0 days.

(21) Appl. No.: 15/318,420

(22) PCT Filed: Jun. 23, 2014

(86) PCT No.: PCT/EP2014/063136
§ 371 (c)(1),
(2) Date: Dec. 13, 2016

(87) PCT Pub. No.: WO2015/197103
PCT Pub. Date: Dec. 30, 2015

(65) Prior Publication Data
US 2017/0126152 A1    May 4, 2017

(51) Int. Cl.
*H02P 6/28* (2016.01)
*H02P 3/12* (2006.01)

(52) U.S. Cl.
CPC ..................................... *H02P 3/12* (2013.01)

(58) Field of Classification Search
CPC .................................... H02P 6/28; H02P 3/12
USPC ........................................................ 318/379
See application file for complete search history.

(56) References Cited

U.S. PATENT DOCUMENTS

| 3,794,898 | A | * | 2/1974 | Gross | H02P 3/22 318/380 |
| 5,698,823 | A | * | 12/1997 | Tanahashi | B66B 1/30 187/296 |
| 6,095,268 | A | * | 8/2000 | Jones, Jr. | B60K 1/02 180/6.5 |
| 8,547,049 | B2 | | 10/2013 | Wang et al. | |

(Continued)

FOREIGN PATENT DOCUMENTS

| CN | 101039776 A | 9/2007 |
| CN | 102882452 A | 1/2013 |

(Continued)

OTHER PUBLICATIONS

International Search Report and Written Opinion for International Application No. PCT/EP2014/063136 dated Feb. 26, 2015.

*Primary Examiner* — Cortez M Cook
(74) *Attorney, Agent, or Firm* — Burr & Forman LLP

(57) ABSTRACT

An apparatus (100) may include a working assembly (220) configured to perform a work function responsive to operation of the working assembly, an electric motor (230) that powers the working assembly, a power source (210) configured to selectively power the electric motor, a control circuitry (240) for controlling operation of the electric motor, and a brake function (270) configured to selectively apply braking to the electric motor responsive to a brake initiation event. The brake function may be configured to apply the braking by short-circuiting motor phase windings of the electric motor without requiring an external power supply during application of the braking.

18 Claims, 2 Drawing Sheets

(56) References Cited

U.S. PATENT DOCUMENTS

Figure 1:
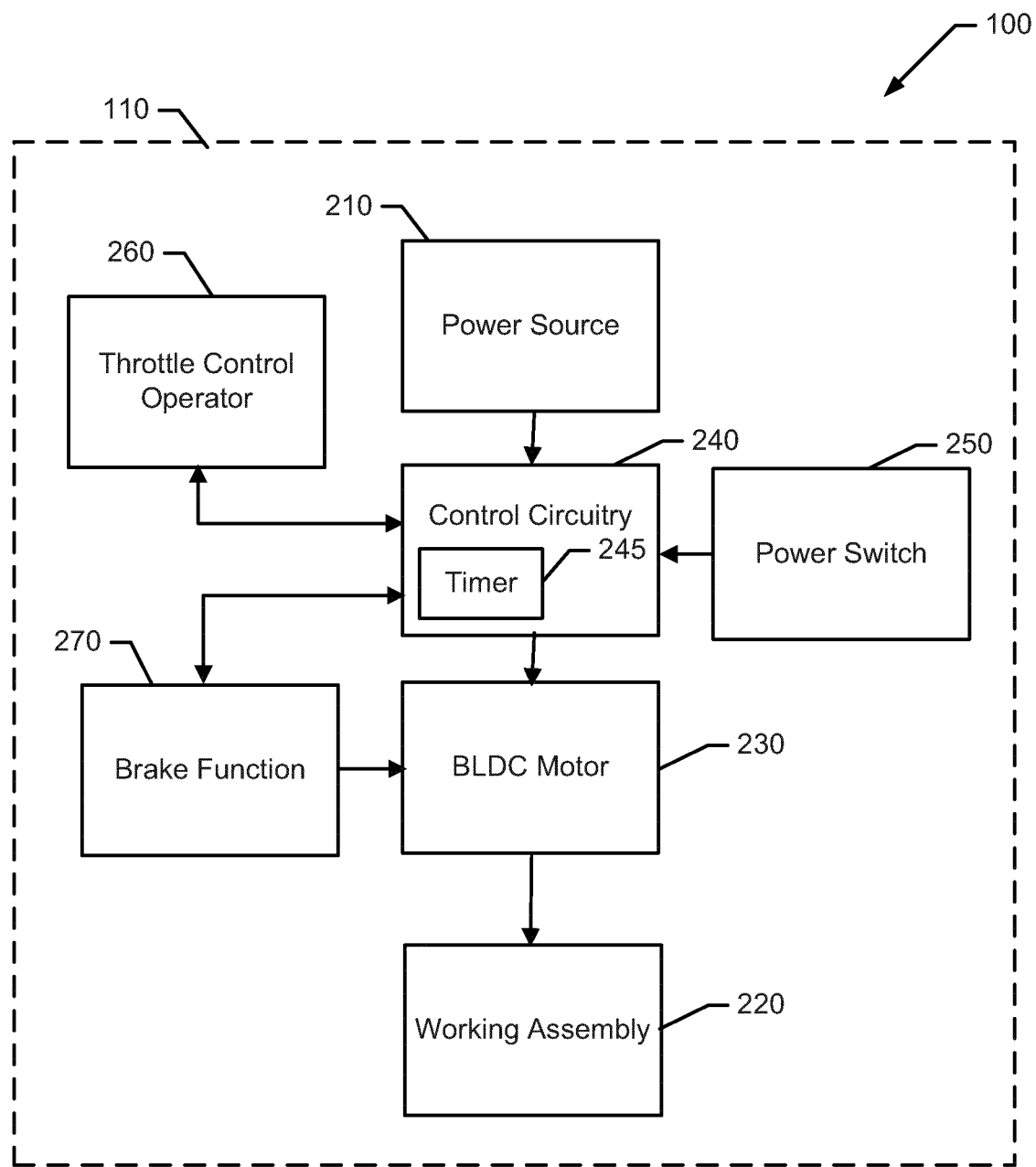

| | | | |
|---|---|---|---|
| 2002/0068655 A1* | 6/2002 | Yamada | B60L 1/003 |
| | | | 475/5 |
| 2002/0158593 A1 | 10/2002 | Henderson et al. | |
| 2004/0207351 A1* | 10/2004 | Hahn | H02P 3/12 |
| | | | 318/379 |
| 2004/0222766 A1 | 11/2004 | Kuehner et al. | |
| 2006/0087267 A1* | 4/2006 | Kawamura | H02P 3/12 |
| | | | 318/364 |
| 2009/0315491 A1* | 12/2009 | Karwath | H02P 6/28 |
| | | | 318/379 |
| 2012/0074881 A1* | 3/2012 | Pant | B25B 23/147 |
| | | | 318/400.09 |
| 2013/0207581 A1 | 8/2013 | Aoki | |
| 2015/0251258 A1 | 9/2015 | Jiang et al. | |

FOREIGN PATENT DOCUMENTS

| | | |
|---|---|---|
| CN | 102972216 A | 3/2013 |
| EP | 2665177 A2 | 11/2013 |
| JP | 2013165536 A | 8/2013 |
| JP | 2013165678 A | 8/2013 |
| JP | 2013-243824 A | 12/2013 |
| WO | 2013122266 A2 | 8/2013 |

* cited by examiner

FAILSAFE HARDWARE BRAKE MECHANISM FOR OUTDOOR POWER EQUIPMENT

TECHNICAL FIELD

Example embodiments generally relate to outdoor power equipment and, more particularly, relate to a braking solution for slowing a working assembly after the operator releases a throttle, where the braking solution is failsafe.

BACKGROUND

Outdoor power equipment includes such devices as mowers, trimmers, edgers, chainsaws, brushcutters, blowers and the like. These devices are often used to perform tasks that inherently require the devices to be mobile. Accordingly, these devices are typically made to be relatively robust and capable of handling difficult work in hostile environments, while balancing the requirement for mobility.

Powering such devices could be accomplished in any number of ways. However, for outdoor power equipment that is intended to be mobile, and for which the emissions (i.e., in terms of noise and/or pollutants) generated by the device may also become an important consideration, electric motors are often popular choices to power such devices. Given that outdoor power equipment operates in hostile environments, a BLDC motor may be a popular choice as the electric motor for such devices.

In this regard, BLDC motors do not include a commutator and brush assembly and thus there is no ionizing sparking generated by the BLDC motor and there is no brush and commutator erosion. BLDC motors use a solid-state circuit for generating an alternating current from a DC electric power source (e.g., a battery). BLDC motors may therefore provide a longer life, reduced noise, and increased reliability relative to DC motors that employ commutators and brushes. Furthermore, BLDC motors can operate in entirely enclosed environments, so they may be isolated from dirt and debris.

When BLDC motors are used to power working assemblies (e.g., blades, chains, fan assemblies, trimmer heads, etc.), the working assembly is typically rotated or otherwise operated responsive to the application of power via some form of operable member such as, for example, a throttle control operator. However, for some of those working assemblies, the rotating member is desirably provided to rotate with a relatively low friction or drag during operation. Thus, when the throttle control operator is released, the working assembly may continue to rotate for some period of time due to inertia. To ensure that the working assembly can be slowed within desired periods of time (which may be defined by safety standards), a braking mechanism may be employed to slow and stop the working assembly.

Two main mechanisms exist for slowing and stopping the working assembly. First, hardware only mechanisms may be employed to stop the BLDC motor. Second, a combination of software and hardware components may be employed.

BRIEF SUMMARY OF SOME EXAMPLES

Some example embodiments may therefore provide structures and methods for facilitating providing a failsafe, hardware braking mechanism for application with electric (e.g., BLDC motor) driven outdoor power equipment.

In accordance with an example embodiment, an apparatus (e.g., outdoor power equipment) may include a working assembly configured to perform a work function responsive to operation of the working assembly, an electric motor that powers the working assembly, a power source configured to selectively power the electric motor, control circuitry for controlling operation of the electric motor, and a brake function configured to selectively apply braking to the electric motor responsive to a brake initiation event. The brake function may be configured to apply the braking by short-circuiting motor phase windings of the electric motor without requiring an external power supply during application of the braking.

In another example embodiment, control circuitry for controlling operation of an electric motor that powers a working assembly of outdoor power equipment powered by a power source is provided. The control circuitry may include a microprocessor, brake initiation event generation circuitry configured to generate at least one signal associated with a brake initiation event, and a brake function. The brake function may be configured to selectively apply braking to the electric motor responsive to the brake initiation event. The brake function may be configured to apply the braking by short-circuiting motor phase windings of the electric motor without requiring an external power supply during application of the braking.

BRIEF DESCRIPTION OF THE SEVERAL VIEWS OF THE DRAWING(S)

Figure 2:
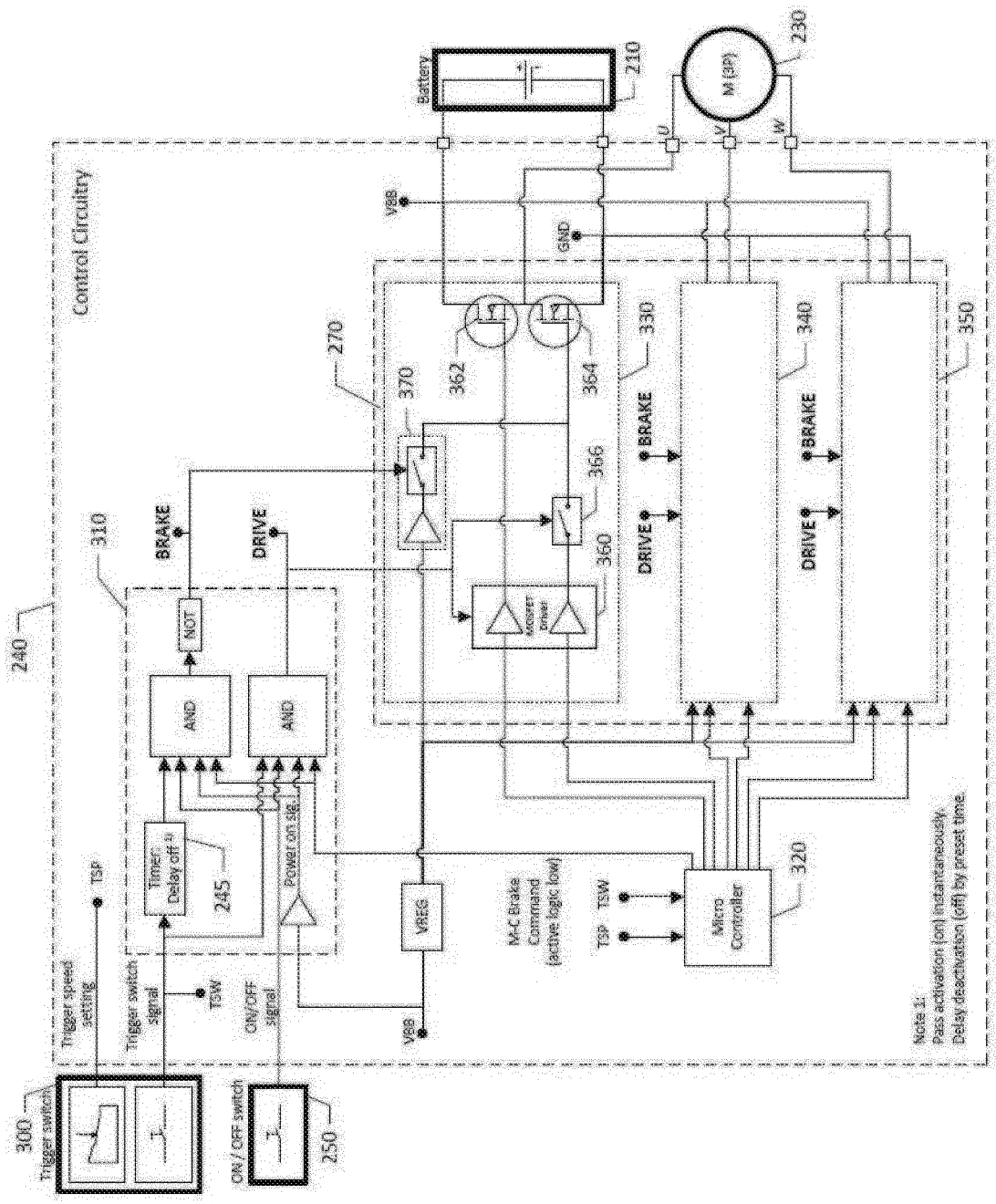

Having thus described the invention in general terms, reference will now be made to the accompanying drawings, which are not necessarily drawn to scale, and wherein:

FIG. 1 illustrates a block diagram of an electric powered device in accordance with an example embodiment; and FIG. 2 illustrates a block diagram of various components of control circuitry usable in accordance with an example embodiment.

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

For brush cutters with metal blades, the blades may rotate for up to 70 seconds after the throttle is released without some form of braking mechanism being employed. Meanwhile it may be required or desirable to stop the blade within 10 seconds, or even as quickly as within 2 to 4 seconds. If no braking mechanism is employed on a hedge trimmer, the cutting blade may not stop for about 3 second, whereas it may be required or desirable to stop the blade within 2 seconds. If no braking mechanism is employed on a lawn mower, the cutting blade may not stop for about 10 second, whereas it may be required or desirable to stop the blade within 3 seconds, and immediate stoppage may be most desirable. Other electric motor operated outdoor power equipment may experience similar mismatches between the desired times for stopping rotation of the working assembly and the time it would take to for the rotation to stop without a braking mechanism.

Some example embodiments described herein provide structures and methods for providing a failsafe hardware braking mechanism to be employed by outdoor power equipment that employs an electric motor (e.g., a BLDC motor). In this regard, some example embodiments may provide for the inclusion of circuitry in the equipment to ensure that the failsafe hardware braking mechanism is triggered at appropriate times and is also able to operate with fault tolerance, with control over braking strength, and with minimal power consumption.

FIG. 1 illustrates a block diagram of an electric powered device 100 in accordance with an example embodiment. It should be appreciated that the electric powered device 100 of FIG. 1 merely represents one generic example of power equipment on which an example embodiment may be employed. However, it should be appreciated that specific example embodiments may be practiced in connection with devices such as, for example, mowers, trimmers, blowers, edgers, chainsaws, and the like. Thus, the device 100 of FIG. 1 is merely an example of a device that may employ a BLDC motor or other DC motor within a housing using a power switch and speed control to power a working assembly.

Referring to FIG. 1, the electric powered device 100 may include a housing 110 inside which various components of the electric powered device 100 are housed. The electric powered device 100 may further include a power source 210, a working assembly 220 and a BLDC motor 230. The BLDC motor 230 may be controlled by control circuitry 240 (which may include motor driver components). A power switch 250 may provide control for the application of power to the BLDC motor 230 and a throttle control operator 260 (e.g., trigger) may control the speed of the BLDC motor 230, if speed control is an option. However, it should be appreciated that the throttle control operator 260 and the power switch 250 may be the same device in some embodiments (e.g. where one discrete switch and one potentiometer are provided in one mechanical assembly, or just one discrete switch is provided). The device 100 may also include a brake function 270 that is configured to stop operation of the working assembly 220 (e.g., via braking the BLDC motor 230) under appropriate circumstances.

As shown in FIG. 1, the brake function 270 may, in some cases, also be controlled by the control circuitry 240. Moreover, in some cases, the brake function 270 may be incorporated into, or be a module of, the control circuitry 240. However, although the brake function 270 may be in communication with, or even under the control of, the control circuitry 240, the brake function 270 may be configured to operate without software control or instructions. As such, the brake function 270 may be utilized to achieve motor braking of the BLDC motor 230 via a hardware solution. As such, there is no need to develop safety critical software with a corresponding level of development assurance and product approval.

Safety critical software that is used to implement braking functions can be problematic when battery power is removed. Obviously, the electronic components that operate responsive to software control will be unable to function without power. Thus, the hardware-based solution provided by the brake function 270 of an example embodiment can provide a significant advantage insofar as being capable of operating even if battery power is removed. Removal of battery power can easily happen if, for example, cable connectors for backpack batteries or other battery packs become disconnected or detached. Moreover, in cases where regenerative braking is used, there would be no power path back to the battery available, as required. The brake function 270 therefore achieves needed braking with lower power consumption and energy storage requirements. In fact, the brake function 270 of an example embodiment can operate without the need for an external power supply during the braking operation. Example embodiments may therefore be failsafe since, loss of power, or even loss of one phase of power, will not prevent the brake function 270 from operating to brake the BLDC motor 230.

Although the brake function 270 of an example embodiment may be implemented as a hardware solution, it should be noted that the brake function 270 of an example embodiment does not need a brake resistor or a relay to operate. Brake resistors and relays can be mechanically bulky and costly. Such components may also take up considerable size, and relays in particular may have limited life spans.

The brake function 270 of an example embodiment may also be configured to employ a preconfigured time delay under some situations. Accordingly, for example, the braking action that is triggered by the brake function 270 may be delayed in certain cases. For example, in the case of brush cutters, it may be desirable to have a delay in stopping cutter movement for 2-4 seconds after the throttle or trigger is released.

In an example embodiment, the braking function 270 may be configured to operate by dissipating rotational energy in the motor windings of the BLDC motor 230 by providing a short circuit current. The short circuit current enables the energy of the rotating components of the BLDC motor 230 to generate heat in the motor windings that can then be dissipated away from the BLDC motor 230. The heat generation therefore dissipates the rotational energy and acts as a resistance to motor rotation. The effect of a brake resistor can therefore be achieved without providing an extra component by dissipating rotational energy in the motor windings via the short-circuit current. Accordingly, the BLDC motor 230 may be provided with heat dissipation structures or otherwise be designed to facilitate heat removal away from the motor windings.

In an example embodiment, the brake function 270 may be configured to operate in at least three specific instances. For example, the brake function 270 may be configured to be actuated to slow the BLDC motor 230 (e.g., by providing a short circuit current to the motor windings) in response to brake initiation stimuli that include: 1) the throttle control operator 260 (e.g., trigger) being released; 2) power of the device being turned off (via the power switch 250); or 3) the power source 210 (e.g., battery) being removed or disconnected. The brake initiation stimuli may each be referred to as a brake initiation event or trigger. In some cases, the control circuitry 240 may further include a timer 245 configured to initiate a delay between the time that the brake initiation event is detected and when the braking function 270 is initiated to slow the BLDC motor 230 (and the working assembly 220). In an example embodiment, the timer 245 may only be used responsive to the throttle control operator 260 (e.g., trigger) being released. As such, braking may instantaneously occur when power is turned off or when the power source 210 is lost.

FIG. 2 provides a block diagram and corresponding circuitry to illustrate the structure that may be used to implement portions of the control circuitry 240 and the brake function 270 in accordance with an example embodiment. As shown in FIG. 2, external inputs to the control circuitry 240 include a trigger switch input 300, which may indicate whether the trigger switch (e.g., the throttle control operator 260 of FIG. 1) is pressed and, in some cases, may further indicate a speed setting of the trigger switch. The trigger switch input 300 may include a normally open switch that opens when the throttle control operator 260 is released. When the normally open switch is opened, it may be detected by the brake initiation circuit 310 to facilitate generation of various brake initiation stimuli or brake initiation events. The brake initiation circuit 310 may also interface with a microcontroller 320 of the control circuitry 240.

In an example embodiment, the brake initiation circuit 310 may facilitate provision of a drive signal (DRIVE) and a brake signal (BRAKE) to a first phase 330, a second phase 340 and a third phase 350 of the brake function 270. The generation of the drive signal and brake signal is illustrated using logic and functional relations, but it should be appreciated that the corresponding electric circuit design can be realized in various ways. Details of one example implementation of the first phase 330 are shown in FIG. 2, and it should be appreciated that the second phase 340 and the third phase 350 may be similarly structured and also operate similarly.

The brake signal (BRAKE) may be in an active state responsive to either a preset time of timer circuit 245 elapsing following a trigger switch signal deactivation, or the power source 210 to the electric powered device being removed, or the power switch 250 being set to off, or the microcontroller 320 providing a brake command.

As shown in FIG. 2, the first phase 330 may include a MOSFET driver 360 that is electrically coupled to a high side MOSFET 362 and a low side MOSFET 364. When the power is turned off to the device, the drive signal may be deactivated and the brake signal may be activated. By deactivation of the drive signal, the isolation switch 366 may be opened and disable the MOSFET driver 360 low side output, allowing the brake gate drive circuit 370 to, without interference, activate the low side MOSFET 364. This may connect the corresponding phase (i.e. the first phase 330 (phase U)) of the BLDC motor to the GND point, which is a common point for all three phases. The high side MOSFET may be disabled during braking since the MOSFET driver 360 power supply originates from the drive signal.

As mentioned above, the second phase 340 and third phase 350 may be similarly structured so the same actions may be repeated to connect the other two phases (phases V and W) as well to the GND node in response to power being turned off, thereby effectively short-circuiting the three phases of the BLDC motor.

Of note, the isolation switch 366 ensures that the brake gate drive circuit 370 can control the low side MOSFET 364 without interference from the MOSFET driver 360 used for the normal motor control function.

The brake gate drive circuit 370 may incorporate an energy storage unit, which may be a capacitor. The brake signal may further be an active low signal, having its active state when not driven or being at GND potential, hence providing a valid brake signal also when the brake initiation circuit 310 is not powered. Due to the separation of the brake gate drive circuit 370 into a dedicated function, the power consumption can be kept to a minimum, thereby minimizing the energy storage needs and allowing the brake function to operate without the need for an external power supply to the electric powered device.

When the trigger switch is released, the deactivation of the drive signal opens the isolation switch 366. The timer 245 may begin counting to generate a delay before the brake signal is generated. When the brake signal is generated, the brake signal may trigger the brake gate drive circuit 370 to activate the low side MOSFET 364 to connect the corresponding phase (phase U) of the BLDC motor 230 to the GND point, which is a common point for all three phases. Again, the second and third phases 340 and 350 may operate similarly. Accordingly, both the activation of the low side MOSFET 364 due to the loss of power source, and the activation of the low side MOSFET 364 due to power being turned off may be instantaneous relative to the corresponding event. However, the activation of the low side MOSFET 364 due to release of the trigger causing deactivation of the trigger switch signal may be delayed by the timer 245.

The timer 245 may be configured to have any desirable time delay. In some cases, the desirable time delay may vary based on the working assembly 220. Thus, for example, some devices may employ working assemblies for which larger delays are desired, while other device may employ working assemblies for which smaller delays are desirable. Even still other devices may have working assemblies that should be stopped without any delay. Thus, the timer 245 may be configured from a zero delay to any other size of time delay that may be desired based on the type of device for which the control circuitry 240 is being used. Thus, one set of control circuitry can be used for a number of different devices that use electric (or BLDC) motors and the only modification needed may be adjustment of the timer 245. In some cases, the timer 245 may have factory settings and may not be operator adjustable. However, in other cases, operator adjustment may be allowed or even encouraged to enable operators to customize the user experience. In some cases, the microcontroller 320 can also be used to override the timer setting by using the brake command output to activate the brake signal immediately. The microcontroller 320 can, however, not extend the timer preset time, and thereby not cause the brake initiation event to be delayed.

In some embodiments, product safety requirements may dictate that certain design criteria be met. For example, design considerations may be employed to use the "single fault" method, which may dictate that one component can fail, but the corresponding function (e.g., braking) must still be performed. The brake function 270 of an example embodiment may therefore be designed based on the principle that separate and independent circuits are used for each BLDC motor phase. As a result, any single phase (e.g., the first phase 330, the second phase 340 or the third phase 350) may include a fault, but the other phases will not be operationally affected. The brake function 270 may then still be enabled to operate if there is a single fault rendering one phase ineffective since the other two phases will remain operational. Some of the parts outside of the three-phase circuits may also be redundantly provided to further robustly provide fault tolerance. If braking on one phase fails, the operation of the other two phases will still ensure that the BLDC motor 230 is stopped within any braking time requirements.

Example embodiments are also configured so that the brake function 270 limits power consumption to less than 50 µA at 15 V. Accordingly, energy storage required for at least 10 seconds of operation may be assured. This serves to ensure that braking can still be executed even when power is lost or interrupted (e.g., due to loss of or disconnection of the battery).

In an example embodiment, braking the BLDC motor 230 by short-circuiting the three-phases may be accomplished in light of certain considerations. First, the motor current may exceed the limits that are tolerated by the motor, wiring and control electronics power stage MOSFETs. Second, the braking action may be leaner or stronger than desirable. A common situation may be that the braking is too strong, causing reaction forces that may be unpleasant for the user.

The braking strength and time may be controlled to a large extend by the motor inductance in combination with motor speed and number of poles. The inductance will generally dominate the motor impedance at high speed. Within the governing equation $$i(t) = \frac{v(t)}{R + jmwL},$$

v and i represent the phase motor voltage and current, respectively, while m represents the motor pole pair number, w is the motor mechanical angular velocity and L and R represent motor inductance and resistance, respectively. In an example case where m=7, L=200 µH and w=2π*7000/60 (7000 rpm), the term mwl≈1 (Ohm).

In practice, this means that when the motor is short-circuited, the current will have the same magnitude as the back EMF of the motor as long as R<<mwl. It is also the case that that magnitude of v(t) is proportional to w, meaning that the current magnitude will remain constant during braking as long as R<<mwl. It can then be appreciated that 1) a constant current magnitude can be obtained during the first phase of braking which is inductance dominated, and 2) the magnitude of the braking current can be controlled using the motor inductance and pole number as a design parameter for braking characteristics. Accordingly, the system can be assured of having sufficient braking, but also limiting the current to a level that the power stage and motor can allow. Typically, a design criteria may be to use the mwl product at normal operating speeds to result in 0.5 to 4 times rated motor current.

The control circuit 240, operating in conjunction with the brake function 270, may therefore be enabled to implement motor braking responsive to the brake initiation stimuli or events to dissipate about 70% to about 95% of the motor rotational energy in the motor phase windings by using motor short-circuiting with the power stage MOSFETs. The braking that is implemented may be accomplished without any need for an external power supply during the braking. Thus, power may be off, or even completely lost (i.e., by battery disconnection or removal), and the braking method may still operate normally. The circuitry for implementing the braking may also be distributed over separate circuits for each phase so that one phase can be lost due to a fault and the braking can still operate effectively. Accordingly, any single faults or failures may not render the braking method inoperable so that the braking method is essentially failsafe.

In some cases, the braking method may incorporate a delay before initiating a braking action responsive to one or more of the brake initiation events. Some embodiments may employ a motor with an inductance and pole number that is tailored in a way that the short-circuit current during braking at nominal speed is controlled to about 0.5 to about 4 times the rated current. Some embodiments may also employ brake circuitry for the brake function 270 based on a principle of operation that provides that, after a configurable time, a power stage MOSFET gate charge is applied and maintained at a sufficient gate charge for the remainder of the braking time. The brake circuitry may also fulfill power consumption requirements of less than 50 µA at 15 V to enable braking without the external power supply. Additionally, if the trigger switch cable is disconnected the braking will be activated.

An apparatus (e.g., outdoor power equipment) of an example embodiment may therefore include a working assembly configured to perform a work function responsive to operation of the working assembly, an electric motor (e.g., a BLDC motor) that powers the working assembly, a power source configured to selectively power the electric motor, control circuitry for controlling operation of the electric motor, and a brake function configured to selectively apply braking to the electric motor responsive to a brake initiation event. The brake function may be configured to apply the braking by short-circuiting motor phase windings of the electric motor without requiring an external power supply during application of the braking. The control circuitry may include a microprocessor, brake initiation event generation circuitry configured to cooperate with the microprocessor to generate at least one signal associated with a brake initiation event, and a brake function (as described above). The ability of the brake function to apply the braking by short-circuiting motor phase windings of the electric motor without requiring an external power supply during application of the braking means that all power to the device and to the control circuitry can be lost, and the brake function can still operate effectively. As such, the brake function can operate independent of any external power supply, and the operation of the brake function can be assured under various fault conditions.

The apparatus (or control circuitry) of some embodiments may include additional features that may be optionally added either alone or in combination with each other. For example, in some embodiments, (1) the brake function may include a first phase, a second phase, and a third phase, each of which includes independent circuitry for connecting a corresponding phase of the electric motor to a common point in response to the brake initiation event, thereby effectively short-circuiting the motor phase windings of the electric motor. In some cases, (2) the brake function may be configured to apply the braking in response to any two of the first phase, the second phase, and the third phase receiving the brake initiation event. In an example embodiment, (1) and/or (2) may be employed and (3) the brake initiation event could be release of a throttle control operator, loss of the power source, or turning power off to the apparatus. In some examples, (4) the control circuitry further includes a timer, and the brake initiation event may be actuated after a preconfigured delay time period of the timer responsive to release of the throttle control operator. In some embodiments, (5) the preconfigured time delay is adjustable by an operator or a factory setting determined based on a device type of the apparatus.

In some embodiments, any or all of (1) to (5) may be employed in addition to the optional modifications or augmentations described below. For example, in some embodiments, the brake function may be configured to consume less than 50 µA at 15 V. Additionally or alternatively, disconnection of a trigger switch cable of the throttle control operator causes application of the brake. Additionally or alternatively, application of the brake dissipates about 70% to about 95% of motor rotational energy in motor phase windings. Additionally or alternatively, in response to disconnection of any one of three phases of the electric motor, the brake function may be configured to apply braking to the electric motor responsive to the brake initiation event.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. An apparatus comprising:
   a working assembly configured to perform a work function responsive to operation of the working assembly;
   an electric motor that powers the working assembly;
   a power source configured to selectively power the electric motor;
   control circuitry for controlling operation of the electric motor; and
   a brake function configured to selectively apply braking to the electric motor responsive to a brake initiation event, the brake function comprising a brake gate drive circuit that controls short-circuiting of a motor phase winding of the electric motor to perform the braking,
   wherein the brake function is configured to apply the braking by short-circuiting motor phase windings of the electric motor without requiring an external power supply during application of the braking;
   wherein the brake function is configured to open an isolation switch connected to a gate terminal of a MOSFET in response to the brake initiation event to disable a drive control signal for normal motor operation from the motor during braking, wherein the brake gate drive circuit is electrically connected between the isolation switch and a gate terminal of the MOSFET and the brake gate drive circuit is configured to activate the MOSFET and connect the motor phase winding to ground for breaking without interference from the drive control signal when the isolation switch is open;
   wherein the control circuitry is configured to, in response to a release of a throttle control operator by a user, cause the brake initiation event after a preconfigured delay time period of a timer; and
   wherein the control circuitry is further configured to, in response to a selected one of a loss of the power source to the apparatus including the electric motor and the control circuitry or a power turn off to the apparatus, cause the break initiation event instantaneously.

2. The apparatus of claim 1, wherein the brake function comprises a first phase, a second phase, and a third phase, each of which includes independent circuitry for connecting a corresponding phase of the electric motor to a common point in response to the brake initiation event, effectively short-circuiting the electric motor.

3. The apparatus of claim 2, wherein the brake function is configured to apply the braking in response to any two of the first phase, the second phase and the third phase receiving the brake initiation event.

4. The apparatus of claim 1, wherein the preconfigured time delay is adjustable by an operator or a factory setting determined based on a device type of the apparatus.

5. The apparatus of claim 1, wherein the brake function is configured to consume less than 50 µA at 15 V.

6. The apparatus of claim 1, wherein disconnection of a trigger switch cable of the throttle control operator causes a brake initiation event.

7. The apparatus of claim 1, wherein application of the brake dissipates about 70% to about 95% of motor rotational energy in motor phase windings.

8. The apparatus of claim 1, wherein the apparatus is outdoor power equipment.

9. The apparatus of claim 1, wherein the electric motor comprises a BLDC (brushless direct current) motor.

10. The apparatus of claim 1, wherein the brake function is further configured to cause the brake initiation event in response to disconnection of any one of three phases of the electric motor.

11. The apparatus of claim 1, wherein the brake function configured to open in the isolation switch is also configured to open the isolation switch to disable a low side output of a MOSFET driver, the isolation switch being connected between the MOSFET driver and the gate terminal of the MOSFET.

12. The apparatus of claim 11 further comprising a high side MOSFET, a gate terminal of the high side MOSFET being connected to the MOSFET driver.

13. Control circuitry for controlling operation of an electric motor that powers a working assembly of outdoor power equipment powered by a power source, the control circuitry comprising:
   brake initiation event generation circuitry configured to generate at least one signal associated with a brake initiation event; and
   a brake function configured to selectively apply braking to the electric motor responsive to the brake initiation event, the brake function comprising a brake gate drive circuit that controls short-circuiting of a motor phase winding of the electric motor to perform the braking,
   wherein the brake function is configured to apply the braking by short-circuiting motor phase windings of the electric motor without requiring an external power supply during application of the braking;
   wherein the brake function is configured to open an isolation switch connected to the gate terminal of a MOSFET in response to the brake initiation event to disable a drive control signal for normal motor operation from the motor during braking, wherein the brake gate drive circuit is electrically connected between the isolation switch and a gate terminal of the MOSFET and the brake gate drive circuit is configured to activate the MOSFET and connect the motor phase winding to ground for breaking without interference from the drive control signal when the isolation switch is open;

wherein the brake initiation event generation circuitry is configured to, in response to a release of a throttle control operator by a user, cause the brake initiation event after a preconfigured delay time period of a timer; and wherein the brake initiation event generation circuitry is configured to, in response to a selected one of a loss of the power source to the outdoor power equipment including the electric motor and the control circuitry or a power turn off to the outdoor power equipment, cause the break initiation event instantaneously.

14. The control circuitry of claim 13, wherein the brake function comprises a first phase, a second phase, and a third phase, each of which includes independent circuitry for connecting a corresponding phase of the electric motor to a common point in response to the brake initiation event, effectively short-circuiting the electric motor.

15. The control circuitry of claim 14, wherein the brake function is configured to apply the braking in response to any two of the first phase, the second phase, and the third phase receiving the brake initiation event.

16. The control circuitry of claim 13, wherein the preconfigured time delay is adjustable by an operator or a factory setting determined based on a device type of the apparatus.

17. The control circuitry of claim 13, wherein in response to disconnection of any one of three phases of the electric motor, the brake function is configured to apply braking to the electric motor responsive to the brake initiation event.

18. The control circuitry of claim 13, wherein the brake initiation event generation circuitry is configured to cooperate with a microprocessor to generate the at least one signal associated with the brake initiation event.

* * * * *